July 7, 1964     I. M. DAVIDSON ETAL     3,139,936
HELICOPTER CONTROL MECHANISM

Filed Dec. 10, 1962     7 Sheets-Sheet 1

Ivor Macaulay Davidson
Leonard Islip
*Inventors*

By
Stevens, Davis, Miller & Mosher
*Attorneys*

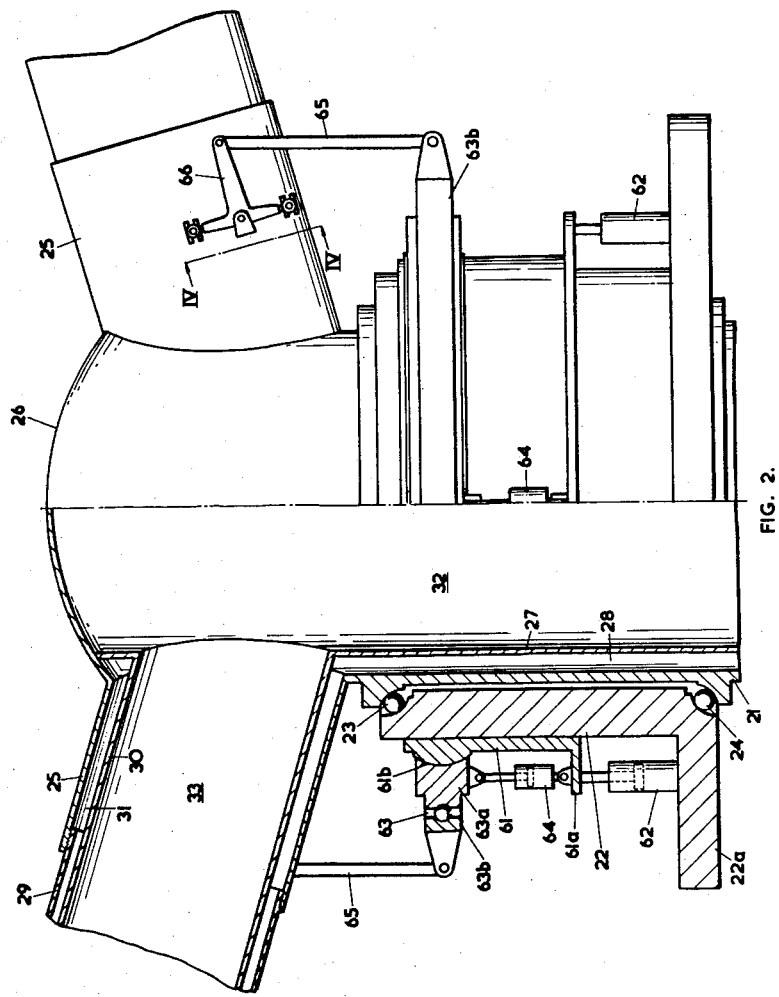

July 7, 1964  I. M. DAVIDSON ETAL  3,139,936
HELICOPTER CONTROL MECHANISM
Filed Dec. 10, 1962  7 Sheets-Sheet 3

Ivor Macaulay Davidson
Leonard Islip
*Inventors*

By
Stevens, Davis, Miller & Mosher
*Attorneys*

July 7, 1964  I. M. DAVIDSON ETAL  3,139,936
HELICOPTER CONTROL MECHANISM
Filed Dec. 10, 1962  7 Sheets-Sheet 6

Ivor Macaulay Davidson
Leonard Islip
*Inventors*

By
Stevens, Davis, Miller & Mosher
*Attorneys*

United States Patent Office 3,139,936
Patented July 7, 1964

3,139,936
HELICOPTER CONTROL MECHANISM
Ivor Macaulay Davidson, Farnborough, and Leonard Islip, Churt, England, assignors to Power Jets (Research and Development) Limited, London, England, a British company
Filed Dec. 10, 1962, Ser. No. 243,403
Claims priority, application Great Britain Dec. 28, 1961
9 Claims. (Cl. 170—135.4)

This invention relates to mechanism for controlling the lift on helicopter rotor blades.

A specific application of the invention is to aircraft of the "convertiplane" type disclosed in copending applications Serial Nos. 77,091, filed December 20, 1960, now Patent No. 3,096,041, 184,305 and 184,306, both filed March 2, 1962. Such aircraft have helicopter rotor blades of substantially circular cross-section, and lift is induced thereon by the circulation control effect of fluid streams discharged as thin spanwise-extending layers over the blade outer surfaces. In order to control an aircraft of this type in its helicopter operation phase it is necessary to make provision for varying the momenta of the fluid streams in prescribed relationship with the rotor rotation, thereby affording the equivalent of cyclic and collective pitch control in a conventional helicopter. It is pointed out in application No. 184,305 that it is advantageous to effect such control by variation of the width of the apertures through which the fluid streams are discharged, and that application discloses one form of operating mechanism. The present invention, in one aspect, provides an alternative mechanism for effecting the variation of width of the apertures referred to.

In conventional helicopters, the cyclic pitch control mechanism gives rise to a simple harmonic variation of blade pitch and lift. In fact however the lift variation required in forward flight does not follow a simple harmonic law, and to allow for this, helicopter rotor blades normally embody flapping hinges which serve to reduce the vibration which would otherwise occur. It is however a feature of the aircraft of the prior patent applications that in operation the blades are locked at a pre-determined coning angle, no flapping hinges being provided, and so if vibration is to be minimised it is necessary to depart from the simple harmonic variation of lift imposed by a swash plate or equivalent mechanism. Further, the blade lift will not necessarily vary linearly with the width of or the fluid discharge from the apertures in the blade, and a further correction may be required in this respect. Accordingly in one aspect the present invention is concerned with the provision in an aircraft of the type referred to of a mechanism whereby the desired relationship between rotor rotation and blade lift may be established.

The invention is not however limited in its application to aircraft of the type described in the prior patent applications but could also be utilised in other forms of helicopter in which lift on the blades is to be varied by the control of spanwise-extending fluid streams discharged therefrom.

The present invention accordingly provides an aircraft having a helicopter rotor blade formed with a longitudinally-extending aperture arranged to discharge a long thin fluid stream, and lift control mechanism comprising an obturating member operable to vary the width of the aperture, a draw bar mounted within and extending longitudinally of the blade, a cam member carried by the draw bar, and a follower connected to the obturating member and bearing on the cam face of the cam member, the draw bar being movable longitudinally of the blade to effect relative movement of the cam member and follower such that the obturating member is operated to vary the aperture width.

According to a feature of the invention there is also provided a swash plate assembly connected to reciprocate the draw bar longitudinally in accordance with rotor rotation, the cam face being shaped to vary the aperture width cyclically in pre-determined relationship with rotor rotation.

The draw bar may carry a plurality of cam members in the form of wedges spaced longitudinally thereof, each being in contact with a separate follower connected to the obturating member for varying the aperture width. The cam faces of the wedges may be differently shaped to afford a different relationship between aperture width and rotor rotation at different stations along the blade.

Preferably the wedges are so arranged that when the draw bar is moved inwardly towards the rotor head, the follower moves up the cam face. The draw bar and wedge or wedges may be split longitudinally, the follower being common to both parts of the wedge. If one part of the draw bar fails, it is thrown outwardly against a stop so that its wedge or wedges are clear of the follower or followers.

In one form, the invention is applied to a helicopter rotor blade formed with two longitudinally-extending apertures arranged to discharge fluid streams as thin layers upwardly and downwardly towards one another over the rounded trailing edge surface of the blade. Each aperture has an obturating member operable by means of a draw bar and wedge or wedges as aforesaid to vary its width. The two draw bars are connected to be reciprocated longitudinally in anti-phase relationship with one another whereby a corresponding anti-phase variation of aperture width is produced.

In the application of the invention to a convertiplane as described in the above-mentioned prior patent applications, the blade is of circular or substantially circular cross-section.

An embodiment of the invention will now be described by way of example with reference to the accompanying diagrammatic drawings of which:

FIGURE 2 is an axial half-sectional view of the helicopter rotor head of the aircraft shown in FIGURE 1.

FIGURES 12, 13, 14(a) and 14(b) show details of the control mechanism of the aircraft.

Figure 15:
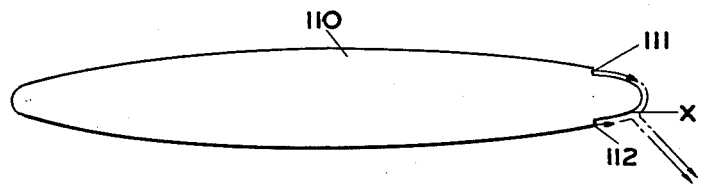

FIG. 15 is a transverse sectional view of an alternative form of a helicopter rotor blade.

Figure 1:
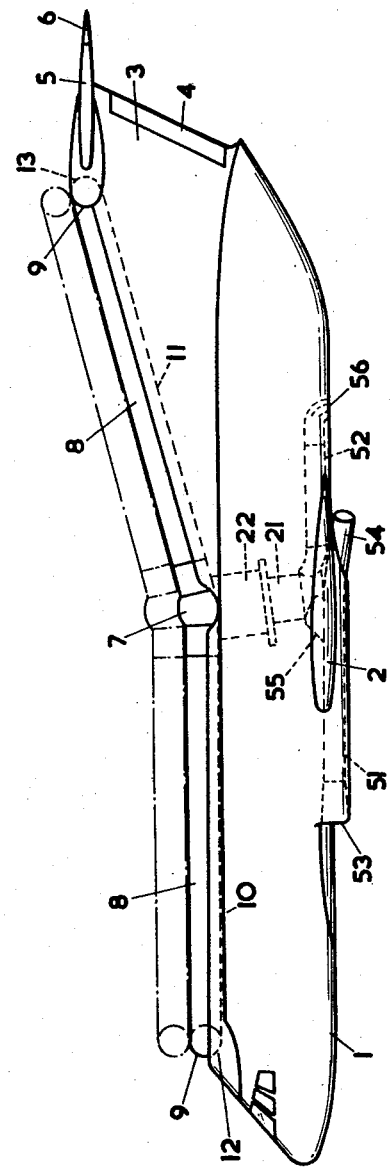
FIGURE 1 is a side view of an aircraft of the convertiplane type.

As shown in FIGURE 1, the aircraft is generally similar to that described in copending patent application No. 184,306. It comprises a fuselage 1, wings 2, fin 3 with rudder 4, and tailplane 5 carrying elevators 6 mounted on the fin. On top of the fuselage is mounted a two-bladed helicopter rotor comprising a rotor head 7, circular section rotor blades 8 and tip jet propulsion units 9 mounted at the extremities of the blades. The axis of the rotor is inclined forwardly and the blades are rigidly attached to the rotor head at a permanent coning angle. The rotor is bodily movable along its axis between the inoperative position shown in full lines in which it is partly housed within the aircraft fixed structure and the operative position shown in chain lines. In the operative position the blades extend in a fore-and-aft direction, the forward blade lying in a longitudinal recess 10 in the fuselage upper surface extending forwardly from the rotor head 7, and the rearward blade lying in a longitudinal recess 11 in the upwardly inclined edge of the fin 3.

When the rotor is in its inoperative position, the tip jet units 9 lie in recesses 12, 13 at the forward end of the fuselage and in the tailplane respectively. In its operative position the rotor is raised to such an extent that it can rotate clear of the aircraft structure.

Referring now to FIGURE 2, the rotor head 7 comprises a pillar 21 rotatably mounted in cylindrical supporting structure 22 by upper and lower bearings 23, 24. The pillar is formed with opposite branches 25 constituting the roots of the rotor blades 7 and is closed at the top by a dome 26. Mounted coaxially within the pillar 21 is a liner 27 defining therewith an annular passage 28. Each rotor blade comprises an outer shell 29 connected to the blade root 25 and an inner liner 30 connected at its inner end to the liner 27 and defining with the shell an annular passage 31 which is in communication with the passage 28. The space 32 within the liner 27 is in communication with the spaces 33 within the blade liners 30, and these latter spaces constitute passages leading to the tip jet units 9.

The supporting structure 22 is itself mounted for bodily axial movement whereby movement of the rotor between its inoperative and operative positions may be effected.

Figure 3:
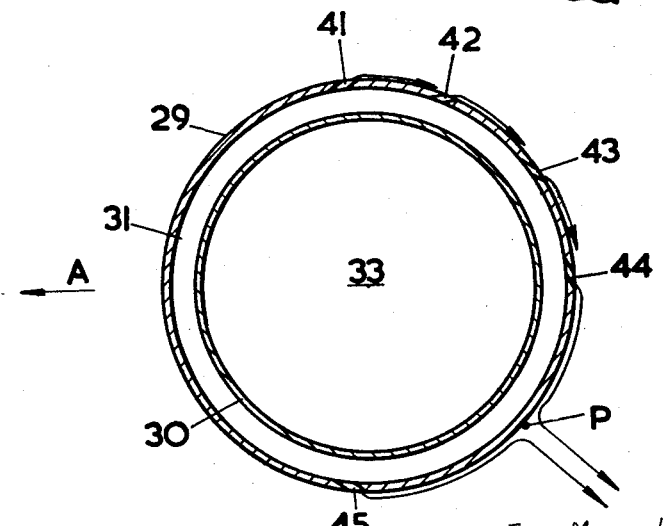
FIGURE 3 is a transverse sectional view of one of the helicopter rotor blades.

As in the prior patent applications, the outer shell 29 of each blade is formed with longitudinally-extending discharge apertures whereby air streams may be discharged over the blade surface as thin layers extending along the length of the blade. FIGURE 3 shows that as in prior application No. 184,305 five such apertures are provided, the first aperture 41 being at or near the top of the blade and the second, third and fourth apertures 42, 43, 44 being spaced rearwardly around the blade circumference approximately at the 30°, 60°, 90° positions. These four apertures are all arranged to discharge thin layers of air from passage 31 over the rearward part of the blade surface from top to bottom, i.e., downwardly and/or rearwardly with respect to the direction of movement of the blade (indicated by arrow A). The fifth aperture 45 is located at a position diametrically opposite aperture 41, i.e., at or near the bottom of the blade, and is arranged to discharge rearwardly and upwardly over the blade surface.

There may be some variation in the number and arrangement of the apertures in the blades as explained in the prior application last referred to.

The aircraft is powered by four gas turbine jet propulsion engines, preferably of the by-pass type, mounted side-by-side in pairs, two forward and two aft of the rotor head as indicated at 51, 52 in FIGURE 1. The forward engines 51 are arranged for flow therethrough in a rearward direction and are connected to draw in air through forwardly facing intakes 53 and to discharge their jet streams through rearwardly directed jet pipes 54. The jet pipes have branches 55 connected to the space 32 within the liner of the rotor pillar 21, and jet deflectors are provided at the junction of each jet pipe with its branch whereby the jet stream may be diverted into the latter. The rearward engines 52 are arranged for flow therethrough in a forward direction and are connected to draw in air through intakes 56 in the fuselage undersurface and to discharge their jet streams directly into the space 32 within the rotor pillar.

The by-pass compressors of the four engines are also connected to supply compressed air to the annular space 28 within the rotor pillar.

The operation of the aircraft is similar to that of the aircraft described in the prior applications. For take-off, the rotor is raised to its operative position (by bodily axial movement of supporting structure 22), all four engines are set in operation, and the jet deflectors are set to divert the jet streams of engines 51 into the branches 55. Thus all four engines supply their jet streams to the interior of the rotor pillar and thence through the passages 33 in the rotor blades to the tip jet units whereby the rotor is driven. The engines also supply compressed air to the annular passages 31 within the rotor blades from which it is discharged through apertures 41, 42, 43, 44 and 45 as layers over the blade surface as shown in FIGURE 3. The streams from apertures 41, 42, 43, 44 reinforce one another and the combined streams flow downwardly over the lower rear quadrant of the blade in a sense opposed to the upwardly and rearwardly directed stream from aperture 45. The rear stagnation point P may accordingly be regarded as being located in the region where the opposed streams meet on the lower rear quadrant of the blade, and the lift thus induced on the blades by circulation control enables the aircraft to rise vertically as a helicopter.

It should be noted that in practice the completely attached flow of the streams as shown in FIGURE 3 is not necessarily achieved.

When sufficient height has been gained the aircraft is tilted to give it some forward motion. As forward speed is gained the lift is taken over by the wings while the jet deflectors can be reversed so that the jet streams from engines 51 are discharged rearwardly to produce forward thrust. Eventually the rearward engines 52 can be shut down altogether so that the drive to the rotor is discontinued. The rotor is then allowed to slow down and is brought to a halt with its blades extending in a fore-and-aft direction after which it is retracted to its inoperative position referred to above.

For landing a reverse sequence of operation is followed.

For control of the aircraft when operating as a helicopter, provision is made for varying the lift on the blades by differential control of the width of apertures 44, 45, the other apertures being of fixed width. The control mechanism will now be described.

The mechanism comprises in the first place a swash-plate assembly shown in FIGURE 2. Mounted upon the supporting structure is a sleeve 61 which can be moved axially up and down by a pair of diametrically opposite hydraulic jacks 62 connected at opposite ends to flanges 61a, 22a on the sleeve and supporting structure respectively. The sleeve is formed with a part-spherical bearing surface 61b carrying the inner race 63a of a ball bearing 63. This ball bearing constitutes a swash-plate which can be tilted on the spherical bearing by differential adjustment of two hydraulic jacks 64 spaced by 90° around the rotor pillar and connected at opposite ends to the inner race 63a and the sleeve flange 61a. The outer race 63b of the ball bearing has pivotally connected to it at diametrically opposite positions push rods 65. The sleeve 61 and the inner race 63a are restrained against rotation but the outer race 63b is carried round with the rotor.

Figure 4:
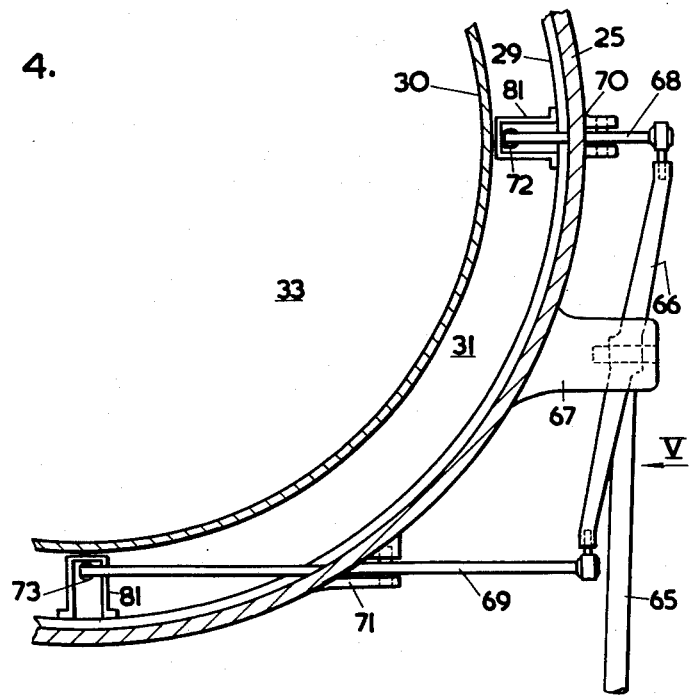
FIGURE 4 is a fragmentary transverse sectional view of the root of one of the rotor blades. This view is taken on the line IV—IV in FIGURE 2 and is to a larger scale than FIGURE 3.
Figure 5:
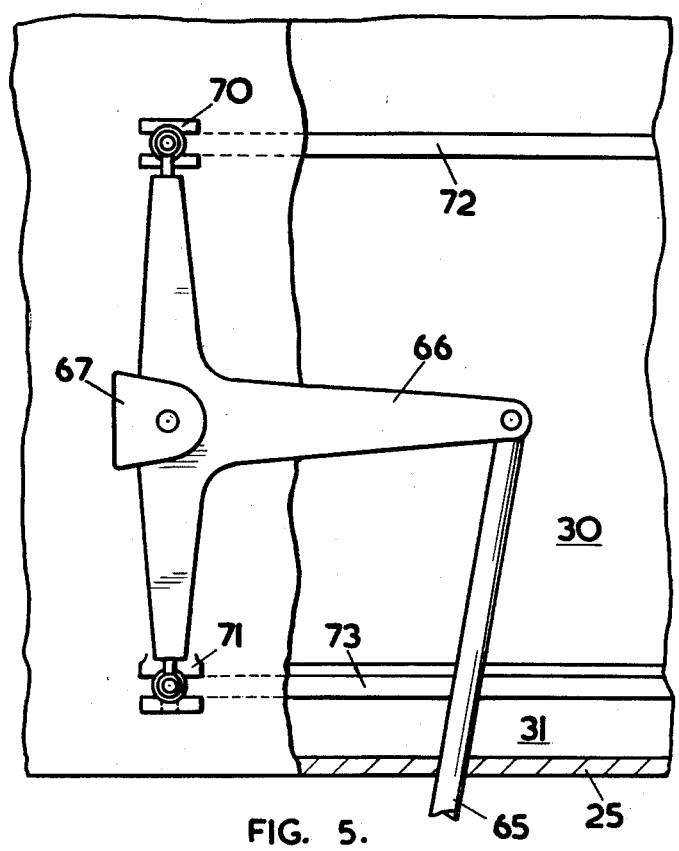
FIGURE 5 is a fragmentary side view of rotor blade root as seen in the direction of the arrow V in FIGURE 4.

Each of the two push rods 65 is pivotally connected at its upper end to the end of one arm of a three-arm lever 66, the levers 66 being mounted one on the root 25 of each rotor blade. Referring now to FIGURES 4 and 5, each lever 66 is pivotally mounted at the junction of its arms in a bracket 67 formed integrally with the blade root. The ends of the other arms are pivotally connected to the ends of two further levers 68, 69, these levers being pivotally mounted in further brackets 70, 71, also formed integrally with the blade root. The pivotal axis of lever 66 is normal to the pivotal axes of levers 68, 69 and all are normal to the longitudinal axis of the blade. The levers 68, 69 extend through seals in the blade root into the space 31 and are pivotally connected at their ends to draw bars 72, 73 extending along the length of the blade within the space.

Figure 8:
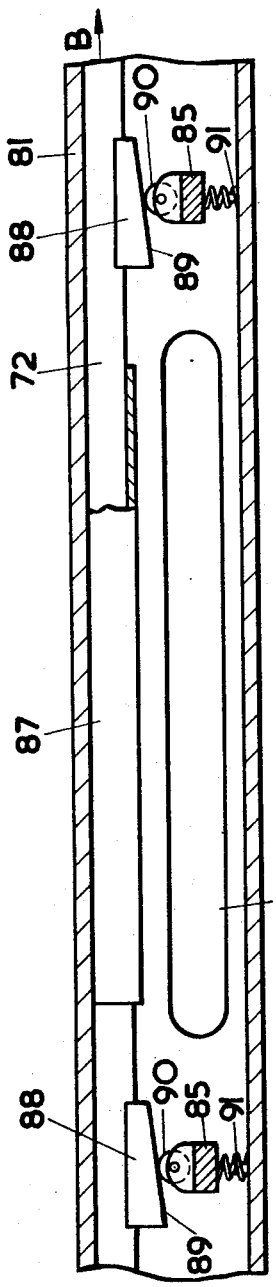
FIGURE 8 is a sectional view taken longitudinally of the rotor blade on the line VIII—VIII in FIGURE 6.
Figure 6:
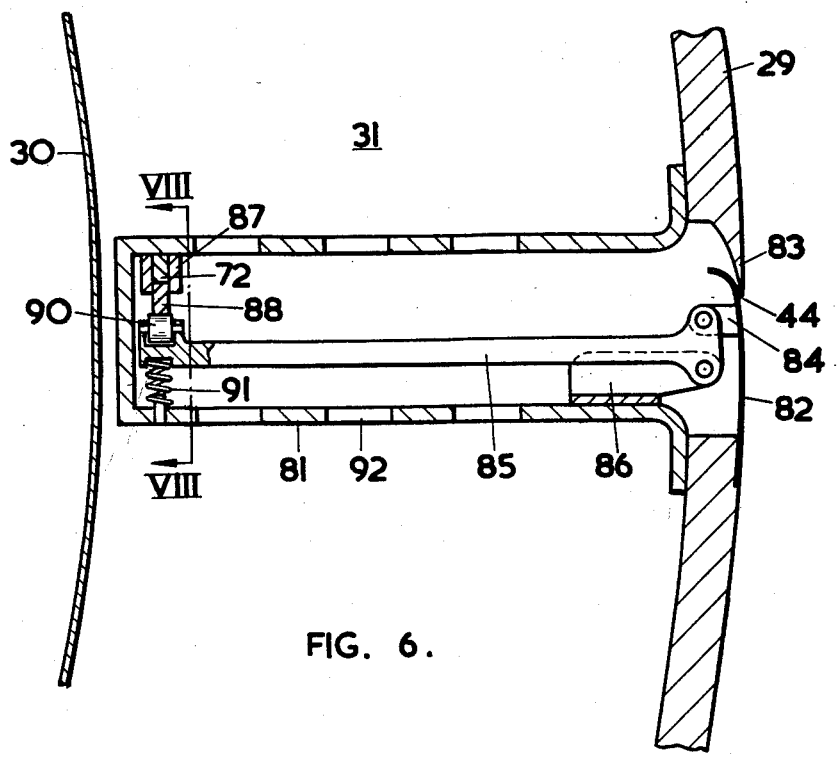
FIGURES 6 and 7 are fragmentary transverse sectional views of the rotor blade at positions near the hub and near the tip respectively. These views are to a still larger scale than FIGURE 4.
Figure 7:
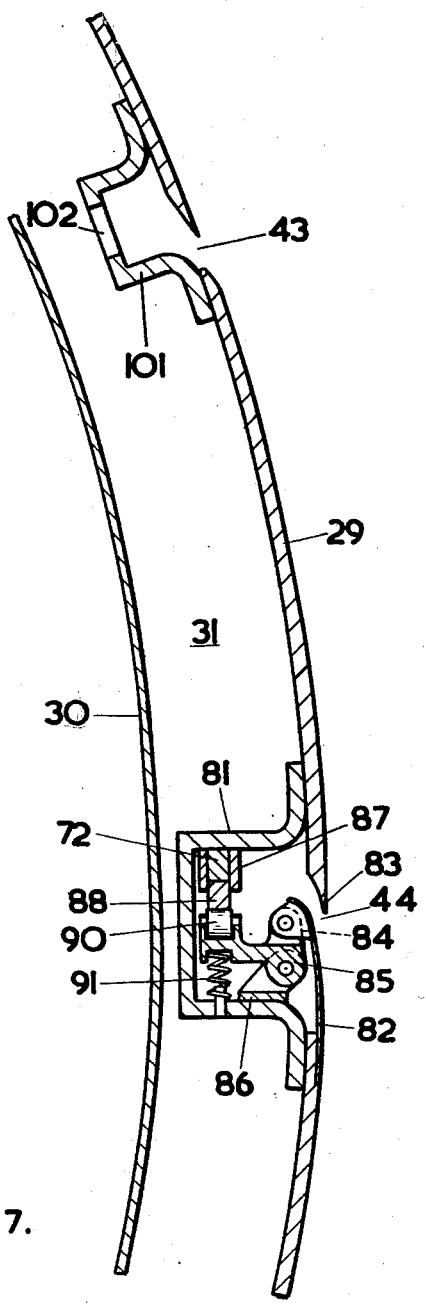

The two draw bars 72, 73 are located at positions corresponding approximately to the rear and bottom of the blade and are operable to vary the width of the apertures 44 and 45 respectively. The arrangement of the draw bar 72 for aperture 44 is shown in FIGURES 6, 7 and 8, that of draw bar 73 being essentially the same. The outer shell 29 of the blade is formed with a longitudinally extending gap which is bridged internally by a longitudinally-extending channel section member 81. An obturating member in the form of a thin flexible strip 82 is anchored along one longitudinal edge to the shell on one side of the gap and its other edge defines with a shaped edge 83 of the shell on the other side of the gap the actual discharge aperture 44. The strip has attached to it at spaced positions along its length a number of lugs 84 to each of which is pivotally connected the end of a lever 85 which is itself pivotally mounted on a bracket 86 attached to the channel section member 81. The draw bar 72 extends longitudinally within the channel section member 81 and is mounted for limited longitudinal movement in guides 87 attached thereto. It is formed with longitudinally spaced recesses in which are detachably mounted wedges 88, one for each lever 85, and each wedge has a cam face 89 against which bears a follower in the form of a roller 90 carried on the end of the associated lever 85. The cam faces are so shaped that when the draw bar is pulled inwardly towards the rotor head (as indicated by arrow B in FIGURE 8), the roller rides up the wedge. The lever 85 is thereby turned about its pivot to bend the flexible strip 82 and increase the width of aperture 44. Similarly, outward movement of the draw bar decreases the width of the aperture. The roller is at all times urged into contact with the cam face by the aerodynamic forces, which tend to close the aperture, and also by the action of a spring 91.

In operation air from the space 31 passes to the aperture 44 through apertures 92 formed in the channel section member 81. As the rotor turns, the draw bar 72 is reciprocated axially on account of its connection through levers 66 and 68 and push rod 65 to the swash plate 63. Thus the width of slot 44 is varied cyclically in accordance with the rotation of the rotor. The draw bar 73 for the slot 45 is similarly reciprocated in anti-phase relationship with the draw bar 72. In this way the widths of apertures 44, 45 are varied cyclically in anti-phase relationship so that the relative momenta of the opposed streams discharged from the apertures, the notional position of the rear stagnation point, and the blade lift are varied.

On account of the inclination of the swash plate, the lift variation will be in the opposite sense on opposite blades. The phase relationship with rotor rotation can be varied by the equivalent of a cyclic pitch control acting to adjust the hydraulic jacks 64 and hence to vary the inclination of the swash plate. In addition, the lift on opposite blades can be varied in the same sense by the equivalent of collective pitch control operable to adjust the jacks 62 to raise or lower the sleeve 61 and the swash plate bodily.

Figure 9:
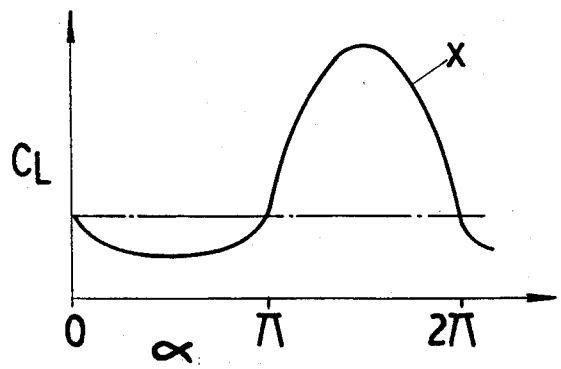
FIGURES 9, 10 and 11 are graphs showing the variation of lift and other parameters.
Figure 10:
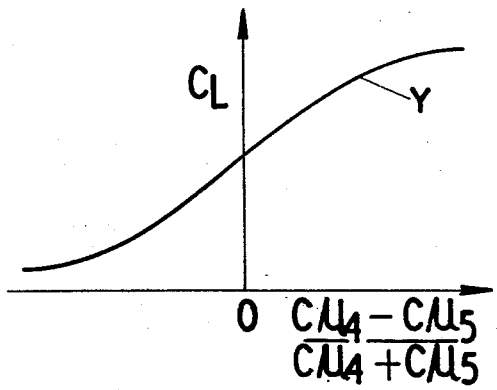
Figure 11:
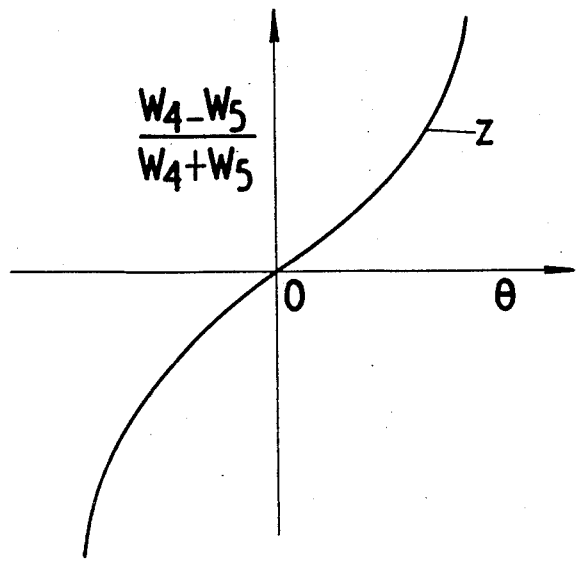

It will be appreciated that the draw bars 72, 73 are reciprocated in accordance with a simple harmonic law. As however the blades are rigidly attached to the rotor head, variation in blade lift in accordance with this law would lead to excessive vibration in forward flight. The nature of variation required to minimise vibration will vary according to the design of the particular aircraft, but it may be expected to be on the lines of curve X in FIGURE 9 where blade lift coefficient $C_L$ is plotted against blade azimuth position $\alpha$, 0 corresponding to a position in which the blade points due aft. Moreover $C_L$ is likely to vary with the discharge from the apertures in the manner represented by the curve Y in FIGURE 10 in which $C_{\mu 4}$ and $C_{\mu 5}$ represent the discharge coefficients of the streams discharged through apertures 44, 45 respectively. To obtain the required lift variation the width $W_4$, $W_5$ of the apertures 44, 45 respectively should vary with swash plate displacement $\theta$ and hence blade azimuth position somewhat as shown by curve Z in FIGURE 11. The required relationship is achieved by suitable shaping of the cam faces 89 of the wedges 88.

The predetermined variation of aperture width may vary along the blade length, for example, to allow for compressibility effects towards the blade tip, and the shape of the cam faces may accordingly be varied along the blade length. Different shapes may also be required for the two apertures 44, 45. Also, to effect the required distribution of air discharge along the length of the blade, the space 31 between the blade shell and liner tapers towards the tip while the width of each aperture increases. The dimensions of the lugs 84, levers 85, and brackets 86 and the location of their pivotal connections are varied accordingly along the blade length and FIGURES 6 and 7 show typical arrangements at inboard and outboard stations respectively.

The anti-phase motion of two draw bars 72, 73 ensures that the centrifugal loads thereon are balanced, so that the operating loads on the rest of the mechanism are quite low. The aerodynamic loading on the flexible strips 82 and the spring loading of levers 85 for one aperture act through draw bars and the levers 66, 68, 69 in opposition to the corresponding loading for the other aperture to take up backlash.

Figure 12:
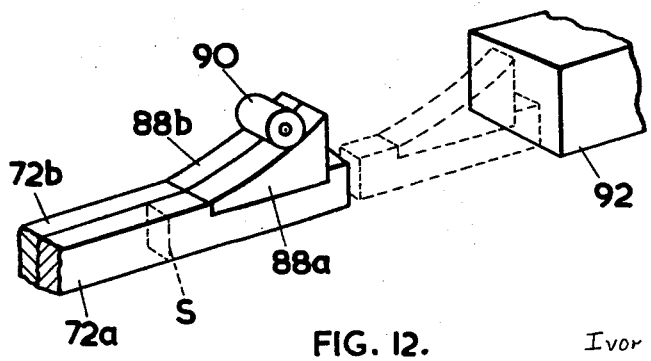

The draw bars are likely to be the most highly loaded components in the mechanism and as a safety measure, each draw bar and its wedges are preferably split longitudinally, as shown in FIGURE 12, the rollers 90 being common to both halves. Should a half-bar 72a fail at position S, the outer part will be thrown outwardly by centrifugal force until its end comes up against a stop 92 at the tip of the rotor blade as shown in dotted lines. The half-wedges 88a are thus thrown clear of the rollers and the operation of the unbroken half-bar 72b and its wedges 88b is unaffected.

As the wedges are formed separately from the draw bars, they may be readily replaced should wear occur. Also by the use of differently shaped wedges the lift variation can be adjusted to suit the mode of operation of each particular aircraft while leaving the control mechanism basically the same for all aircraft of a particular range.

The levers 66, 68, 69 may similarly be split, the half levers being connected independently to one another and to the respective halves of the draw bars, and the push rods 65 being connected to lever 66 in such a way that failure of half of the mechanism does not affect the other half.

Figure 13:
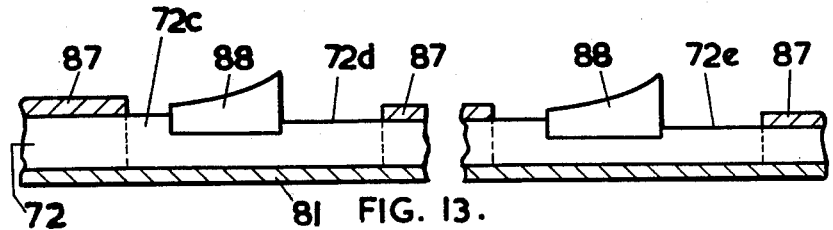

To reduce stresses, the draw bars are preferably reduced in cross-sectional dimensions towards the tip. Thus the parallel portions 72c, 72d, 72e of the bar running in the guides 87 between successive wedges may be progressively stepped down in an outwards direction as shown in FIGURE 13.

Figure 14:
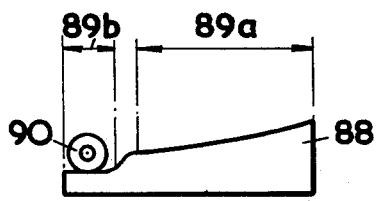
Figure 14:
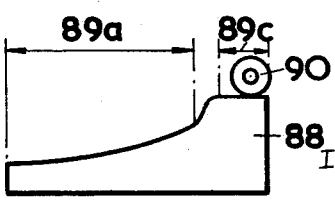

The mechanism for varying the aperture width is such as to effect the movement of the rear stagnation point P over the blade lower rear quadrant in the range required for flight in the helicopter phase of operation. When however the rotor is being decelerated prior to retraction in flight or accelerated prior to transition to the helicapter operation phase, it may be desirable to bring the rear stagnation point to the blade trailing edge for zero lift while still closing up the wake behind the blade whereby drag is minimised. It may therefore be necessary to close aperture 44 altogether and to further open aperture 45. To this end the cam faces of the wedges for the apertures 44 and 45 may be shaped as shown in FIGURES 14(a) and 14(b) respectively. In each case the portion 89a of the cam face corresponds to the normal operating region. During the deceleration and acceleration phases referred to, the collective jacks 62 operated by the pilot (or automatically) to move the swash plate (in an unswashed condition) to an extreme position whereby the draw bars are moved so that the rollers move on to dwells 89b, 89c at opposite ends of the wedges of the two draw bars as shown in FIGURES 14(a) and 14(b). The aperture 44 in each blade is thereby closed or nearly closed while the aperture 45 is opened to such an extent that the rear stagnation point is brought to the blade trailing edge.

It is pointed out that in the drawings, the rise over the cam faces is much exaggerated. The rise might be no more than 0.050" in a full scale aircraft. The flexible strips 82 may in practice be made up of a number of successive sections articulated at their connections to the lugs 84.

In some circumstances it may be not necessary to vary the aperture width along the full length of the blade. Hence the arrangement of FIGURES 6, 7 and 8 may apply to only the outboard part of the apertures, the inboard parts being of fixed width in the same way as apertures 41, 42, 43. FIGURE 7 shows the construction of aperture 43 which is bridged internally by a channel-section member 101 formed with apertures 102 for the passage of the compressed air.

The mechanism described may take various alternative forms. In some cases there might be a single draw bar carrying two sets of wedges for the two apertures. The flexible strips 82 could be replaced by pivotally mounted members which might be formed as extensions of the levers 85. The levers 66, 68, 69 might be replaced by a ring at the blade root which is oscillated about the longitudinal axis of the blade by the push rod 65, the draw bars having at their inner ends rollers bearing on cam faces on the ring. In this case the required relationship between blade lift and rotor rotation might be achieved in part by the shaping of the cam faces on the ring. The swash plate arrangement and the linkage connecting it to the draw bars might be put inside the rotor pillar but the arrangement described is thought to be advantageous in respect of ease of servicing.

Another application of the invention is to a helicopter (not necessarily of the convertiplane type) having substantially elliptical section blades as suggested in British patent specification No. 883,865 and U.S. patent specification No. 3,062,483. Each blade 110 (FIGURE 15) has two longitudinally-extending discharge apertures 111, 112, one on each side of the trailing edge and arranged to discharge fluid streams as thin layers rearwardly over the rounded trailing edge surface. The blade lift is varied by differential variation of the width of the two apertures using a control mechanism as described above.

Another application of the invention is to a helicopter utilising the jet flap principle. In this case each rotor blade is formed at its trailing edge with a longitudinally-extending jet nozzle arranged to discharge a fluid stream rearwardly as a long thin jet sheet. The lift on the blades is varied by varying the width of the nozzle and the required relationship between rotor rotation and blade lift is achieved by the use of a draw bar mechanism and wedges similar to those already described. In this case only a single draw bar is required, though it might still be split for reasons of safety as discussed above.

We claim:
1. An aircraft comprising a helicopter rotor including a rotor head and a rotor blade attached thereto, the rotor blade having a rounded trailing edge surface and being formed with two longitudinally extending discharge apertures; means to supply fluid to said apertures, said apertures being arranged to discharge the fluid as long thin layers upwardly and downwardly towards one another over the trailing edge surface; and lift control mechanism comprising two obturating members, one for each aperture, operable to vary the width thereof, two draw bars, one for each aperture, mounted within and extending longitudinally of the blade, two cam members, one carried by each draw bar and each having a cam face, two followers, one connected to each draw bar and bearing on the cam face of the respective cam member, and means for moving the draw bars longitudinally of the blade to effect relative movement of the cam members and followers so that the obturating members are operated to vary the width of the two apertures in opposite senses.

2. An aircraft comprising a helicopter rotor including a rotor head and a rotor blade attached thereto, the rotor blade having a rounded trailing edge surface and being formed with two longitudinally-extending discharge apertures; means to supply fluid to said apertures, said apertures being arranged to discharge the fluid as long thin layers upwardly and downwardly towards one another over the trailing edge surface; and lift control mechanism comprising two obturating members, one for each aperture, operable to vary the width thereof, two draw bars, one for each aperture, mounted within and extending longitudinally of the blade, two cam members, one carried by each draw bar and each having a cam face, two followers, one connected to each draw bar and bearing on the cam face of the respective cam member, and a swash plate mechanism operatively connected to the rotor and to the draw bars to reciprocate the draw bars longitudinally in anti-phase relationship with one another in accordance with rotor rotation and effect relative movement of the cam members and followers so that the obturating members are operated to vary the width of the two apertures, the cam faces being shaped so that the width of the two apertures is varied cyclically in predetermined relationship with rotor rotation and in opposite senses.

3. An aircraft according to claim 2 wherein the rotor blade is of substantially circular cross-section.

4. An aircraft according to claim 3 wherein the apertures are located one substantially at the rear and one substantially at the bottom of the blade, and face downwardly and rearwardly respectively.

5. An aircraft according to claim 4 wherein the cam faces are shaped to close the aperture at the rear of the blade on movement of the draw bars to an extreme position.

6. An aircraft according to claim 4 wherein the blade is formed with further longitudinally extending discharge apertures of fixed width in the upper part of its surface, said fluid supply means being connected to supply fluid to said further apertures and said further apertures being arranged to discharge the fluid as long thin layers rearwardly and downwardly over the trailing edge surface of the blade.

7. An aircraft according to claim 6 further comprising wings capable of supporting the aircraft by aerodynamic lift thereon in forward flight.

8. An aircraft according to claim 7 wherein the rotor is retractable into the aircraft fixed structure.

9. An aircraft according to claim 2 wherein the rotor blade is of substantially elliptical cross-section.

References Cited in the file of this patent
UNITED STATES PATENTS

| | | |
|---|---|---|
| 2,344,515 | Massey | Mar. 21, 1944 |
| 2,493,041 | Stalker | Jan. 3, 1950 |
| 2,493,042 | Stalker | Jan. 3, 1950 |
| 2,792,189 | Altemus | May 14, 1957 |
| 2,925,129 | Yuan | Feb. 16, 1960 |

UNITED STATES PATENT OFFICE
CERTIFICATE OF CORRECTION

Patent No. 3,139,936                         July 7, 1964

Ivor Macaulay Davidson et al.

It is hereby certified that error appears in the above numbered patent requiring correction and that the said Letters Patent should read as corrected below.

Column 8, line 55, for the claim reference numeral "6" read -- 3 --.

Signed and sealed this 12th day of January 1965.

(SEAL)
Attest:

ERNEST W. SWIDER
Attesting Officer

EDWARD J. BRENNER
Commissioner of Patents